United States Patent
Wang (10) Patent No.: US 11,023,533 B2
(45) Date of Patent: Jun. 1, 2021

(54) NODE TASK DATA DISPLAY METHOD AND APPARATUS, STORAGE MEDIUM AND COMPUTER EQUIPMENT

(71) Applicant: PING AN TECHNOLOGY (SHENZHEN) CO., LTD., Guangdong (CN)

(72) Inventor: Jing Wang, Guangdong (CN)

(73) Assignee: PING AN TECHNOLOGY (SHENZHEN) CO., LTD., Guangdong (CN)

( * ) Notice: Subject to any disclaimer, the term of this patent is extended or adjusted under 35 U.S.C. 154(b) by 210 days.

(21) Appl. No.: 16/461,888

(22) PCT Filed: Oct. 30, 2017

(86) PCT No.: PCT/CN2017/108348
§ 371 (c)(1),
(2) Date: May 17, 2019

(87) PCT Pub. No.: WO2019/051946
PCT Pub. Date: Mar. 21, 2019

(65) Prior Publication Data
US 2019/0370291 A1    Dec. 5, 2019

(30) Foreign Application Priority Data

Sep. 13, 2017 (CN) .......................... 201710824266.1

(51) Int. Cl.
*G06F 16/9038* (2019.01)
*G06F 16/903* (2019.01)
(Continued)

(52) U.S. Cl.
CPC ........ *G06F 16/9038* (2019.01); *G06F 16/904* (2019.01); *G06F 16/906* (2019.01); *G06F 16/90335* (2019.01); *G06Q 10/06316* (2013.01)

(58) Field of Classification Search
CPC .............. G06F 16/9038; G06F 16/906; G06F 16/90335; G06F 16/06316; G06Q 10/06; G06Q 10/0633
(Continued)

(56) References Cited

U.S. PATENT DOCUMENTS 5,450,326 A * 9/1995 Black .................. H01L 22/20
257/E21.525
6,151,583 A * 11/2000 Ohmura ............... G06Q 10/10
705/7.26
(Continued)

FOREIGN PATENT DOCUMENTS

CN       101271473 A       9/2008
CN       103455895 A      12/2013
(Continued)

OTHER PUBLICATIONS

International Search Report dated Dec. 29, 2017 in parent application PCT/CN2017/108348. 2 pages.
(Continued)

*Primary Examiner* — Phuong Thao Cao
(74) *Attorney, Agent, or Firm* — Polsinelli PC (57) ABSTRACT

The present application relates to a node task data display method. The method comprises: receiving a query instruction for node task data, the query instruction carrying a user identifier and a node identifier; querying node task data associated with the user identifier from a node task data table associated with the node identifier according to the query instruction; querying variable configuration information
(Continued)

associated with the user identifier from a variable configuration information table associated with the node identifier; extracting a variable value corresponding to the variable configuration information from each piece of queried node task data; and displaying in order each piece of queried node task data according to the extracted variable value of each piece of node task data.

17 Claims, 7 Drawing Sheets

(51) Int. Cl.
    *G06Q 10/06*     (2012.01)
    *G06F 16/906*     (2019.01)
    *G06F 16/904*     (2019.01)

(58) Field of Classification Search
    USPC .................................................. 707/723
    See application file for complete search history.

(56) References Cited

U.S. PATENT DOCUMENTS

| | | | | |
|---|---|---|---|---|
| 6,292,790 | B1* | 9/2001 | Krahn | G06F 21/6209 700/79 |
| 6,986,138 | B1* | 1/2006 | Sakaguchi | G06Q 10/10 718/105 |
| 7,296,056 | B2* | 11/2007 | Yaung | G06Q 10/06 709/205 |
| 7,418,448 | B2* | 8/2008 | Hensel | G06Q 10/06 707/791 |
| 7,441,007 | B1* | 10/2008 | Kirkpatrick | G06F 9/44505 709/213 |
| 8,818,975 | B2* | 8/2014 | Aigner | G06F 16/252 707/705 |
| 10,545,951 | B1* | 1/2020 | Lieberman | G06F 16/258 |
| 10,642,838 | B2* | 5/2020 | Kuehner | G06Q 10/063 |
| 2002/0112038 | A1* | 8/2002 | Hessmer | H04L 41/0226 709/220 |
| 2003/0208374 | A1* | 11/2003 | Mangtani | G06Q 10/0633 705/7.27 |
| 2004/0196310 | A1* | 10/2004 | Aamodt | G06Q 10/00 715/738 |
| 2006/0004832 | A1* | 1/2006 | Langsford | G06Q 10/06 |
| 2006/0277476 | A1* | 12/2006 | Lai | G06F 40/143 715/760 |
| 2007/0192128 | A1* | 8/2007 | Celestini | G06Q 40/00 705/35 |
| 2007/0236708 | A1* | 10/2007 | Jahn | G06Q 10/06 358/1.6 |
| 2008/0022357 | A1* | 1/2008 | Agarwal | H04L 63/20 726/1 |
| 2008/0065448 | A1* | 3/2008 | Hull | G06Q 10/06316 705/7.26 |
| 2008/0114733 | A1 | 5/2008 | Friesenhahn et al. | |
| 2008/0184231 | A1* | 7/2008 | Dreiling | G06Q 10/06 718/100 |
| 2008/0301703 | A1* | 12/2008 | Nixon | G06F 8/38 719/312 |
| 2009/0063619 | A1* | 3/2009 | Chijiiwa | G06F 16/958 709/203 |
| 2009/0064130 | A1* | 3/2009 | Davis | G06Q 10/10 717/173 |
| 2009/0064171 | A1* | 3/2009 | Davis | G06Q 10/06 718/106 |
| 2009/0158281 | A1* | 6/2009 | Omori | G06F 9/5038 718/101 |
| 2009/0198541 | A1* | 8/2009 | Dolan | G06Q 10/06 705/29 |
| 2012/0046029 | A1* | 2/2012 | Sylvain | H04L 67/24 455/423 |
| 2012/0159494 | A1* | 6/2012 | Shafiee | G06F 9/5038 718/102 |
| 2012/0209997 | A1* | 8/2012 | Duan | G06Q 30/00 709/224 |
| 2013/0103441 | A1* | 4/2013 | Doganata | G06Q 10/06 705/7.12 |
| 2013/0124254 | A1* | 5/2013 | Jafri | G06Q 10/10 705/7.26 |
| 2013/0132419 | A1* | 5/2013 | Befort | G06Q 10/06 707/769 |
| 2014/0109097 | A1* | 4/2014 | Datla | G06F 9/46 718/102 |
| 2014/0282364 | A1* | 9/2014 | Woodward | G06F 8/34 717/105 |
| 2014/0337071 | A1* | 11/2014 | Stiffler | G06Q 10/06311 705/7.13 |
| 2015/0186564 | A1* | 7/2015 | Schmidt | H04L 41/22 703/13 |
| 2016/0218975 | A1* | 7/2016 | Hyoudou | H04L 45/7453 |
| 2017/0048276 | A1* | 2/2017 | Bailey | G06F 3/04842 |
| 2017/0078140 | A1* | 3/2017 | Gibson | H04B 7/15542 |
| 2017/0093977 | A1* | 3/2017 | Amemiya | H04L 67/2842 |
| 2018/0144272 | A1* | 5/2018 | Moroo | G06F 9/505 |
| 2018/0278499 | A1* | 9/2018 | Diwakar | H04L 43/0817 |
| 2019/0026663 | A1* | 1/2019 | Homeyer | G06Q 10/06316 |

FOREIGN PATENT DOCUMENTS

| | | | |
|---|---|---|---|
| CN | 104408568 A | | 3/2015 |
| CN | 104836716 A | | 8/2015 |
| CN | 105117115 A | | 12/2015 |
| CN | 105184470 A | | 12/2015 |
| CN | 106203170 A | * | 12/2016 |

OTHER PUBLICATIONS

Chinese Office Action dated Oct. 23, 2018 in patent application CN 2017108242661. 7 pages.

* cited by examiner

NODE TASK DATA DISPLAY METHOD AND APPARATUS, STORAGE MEDIUM AND COMPUTER EQUIPMENT

CROSS-REFERENCE TO RELATED APPLICATIONS

This application claims priority to Chinese Patent Application No. 2017108242661, entitled "NODE TASK DATA DISPLAY METHOD, DEVICE, STORAGE MEDIUM, AND COMPUTER APPARATUS" filed Sep. 13, 2017, the contents of which is expressly incorporated herein by reference in its entirety.

TECHNICAL FIELD

The present disclosure relates to information processing technologies, and in particular, to a method of displaying node task data, a device, a storage medium, and a computer apparatus.

BACKGROUND

Workflow, which organizes a set of tasks to complete a business process, is an abstract and general description of business rules of a business process and between various operational steps of the business process. The workflow defines a trigger sequence and trigger conditions of the task, and splits each task into multiple node tasks. Each node task can be completed by one or more software systems, or can be completed by one or a group of people, or can be completed by one or more people working with the software system. A main problem solved by workflow is that in order to achieve a business goal, computer can be used to automatically deliver documents, information, or tasks between multiple participants according to a certain predetermined rule.

In a conventional display method of a node task data on the workflow, corresponding fixed variables are generally provided for each node on the workflow, and the task data to be processed or the processed task data in the corresponding node are sorted and displayed via the variables. For example, a fixed field can include the urgency of the task and the allocation time of the task. According to the urgency of the task and the allocation time of the task, the tasks to be displayed are sorted and displayed according to a sequence of the urgency of the task and a sequence of the assigned time.

However, in a process of an actual display of the node task data of the workflow, when the node task data to be displayed is too much, a focus of the node task data that are to be viewed may not be the same in different task nodes or different task types. For example, taking insurance as an example to illustrate, a business personnel focuses on the level of the claim priority as an interest variable for the node task data of a certain node of a property insurance type; and focuses on a underwriting amount as the interest variable for the node task data of a certain node of a life insurance type. In the conventional display method of the node task data, it is difficult to flexibly sort and display various types of node task data, due to the fixed set query variables.

SUMMARY

According to various embodiments of the present disclosure, a method of displaying node task data, a device, a storage medium, and a computer apparatus are provided.

A method of displaying node task data includes:

receiving a query instruction for node task data, wherein the query instruction carries a user identifier and a node identifier;

according to the query instruction, querying the node task data associated with the user identifier from a node task data table associated with the node identifier;

querying a variable configuration information associated with the user identifier from a variable configuration information table associated with the node identifier;

extracting a variable value corresponding to the variable configuration information from each copy of queried node task data; and sorting and displaying each copy of queried node task data according to an extracted variable value in each copy of node task data.

A node task data display device includes:

a query instruction receiving module, configured to receive a query instruction for node task data, wherein the query instruction carries a user identifier and a node identifier;

a node task data querying module, configured to query the node task data associated with the user identifier from a node task data table associated with the node identifier according to the query instruction;

a variable configuration information querying module, configured to query a variable configuration information associated with the user identifier from a variable configuration information table associated with the node identifier;

a variable value extracting module, configured to extract a variable value corresponding to the variable configuration information from each copy of queried node task data; and a sorting and displaying module, configured to sort and display each copy of queried node task data according to an extracted variable value in each copy of node task data.

At least one non-transitory computer-readable storage medium storing computer-readable instructions, which, when executed by one or more processors, perform the steps of the method described in various embodiments of the present application.

A computer apparatus includes one or more processors and a memory storing computer-readable instructions, which, when executed by the one or more processors, cause one or more the processors to perform the steps of the method described in various embodiments of the present application.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention.

Figure 1:
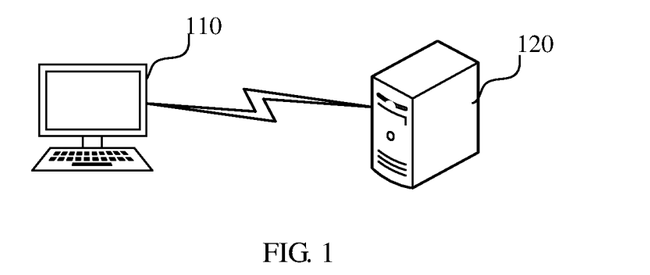
FIG. 1 is a schematic diagram illustrating an environment adapted for a method of displaying node task data according to one of the embodiments.

In one embodiment, a method of displaying node task data is provided, which can be implemented in the environment shown in FIG. 1. Referring to FIG. 1, a terminal 110 communicates with a server 120 over a network. Corresponding node task data and variable configuration information are stored on the server 120. The terminal 110 is provided with a corresponding interface for querying and displaying the node task data. A user can access a workflow data processing platform and enter a processing interface in the workflow for the node task data on a certain node by inputting the corresponding node task data processing account information. The terminal 110 can receive a query instruction triggered by the user for the node task data on the workflow, obtain corresponding node task data and variable configuration information from the server 120, and sort and display the corresponding node task data according to the variable configuration information of data display of the user on the node. In one embodiment, the node task data and the variable configuration information can also be pre-stored in a database of the terminal 110 itself, so that the corresponding data can be directly read from the database of itself, without acquiring from the server.

Figure 2:
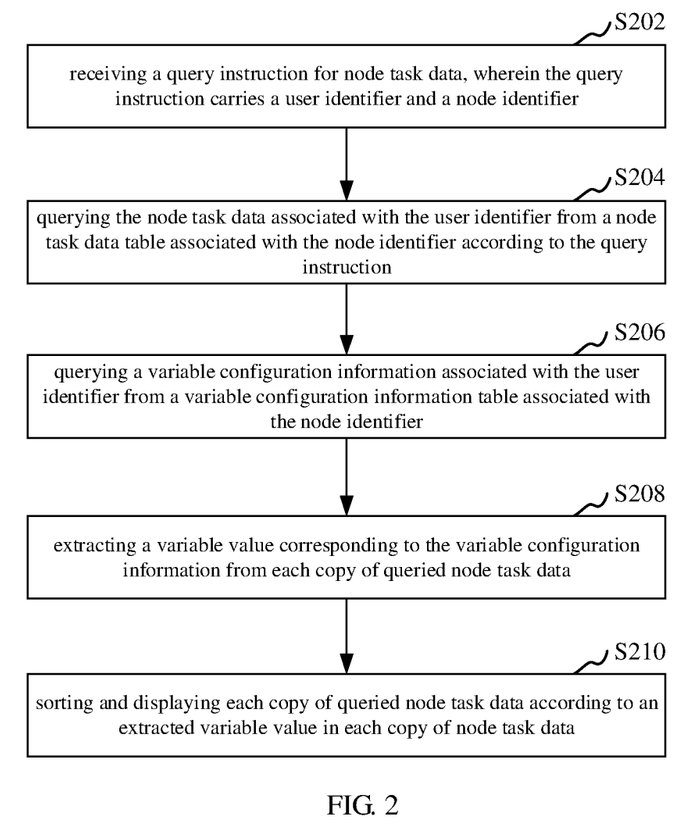
FIG. 2 is a flowchart illustrating a method of displaying node task data according to one of the embodiments.

In one embodiment, a method of displaying node task data is provided. The method can be applied to the terminal shown in FIG. 1 by way of example. Referring to FIG. 2, the method includes:

In step S202, a query instruction for the node task data is received, and the query instruction carries a user identifier and a node identifier.

In this embodiment, the terminal may firstly receive an access operation of the user to the BPM (Business Process Management) system, display a corresponding workflow data processing interface after a verification of a login account and password of the user on the BPM system is passed, and acquire a user information corresponding to the login account. The user information includes the user identifier and a personal information of the user. The user identifier can be a character string, which includes at least one type of character such as number, letter, punctuation mark, and the like for uniquely identifying the corresponding user.

In one embodiment, multiple nodes are set in the BPM system. The task data that are to be displayed under different nodes are not necessarily the same, and node tasks on different nodes assigned to different users for processing or user permission to query the node task data are not necessarily the same. The terminal can respond to the query operation of the user on the workflow data processing interface, and trigger a corresponding query instruction according to the query operation. The query instruction can be a query instruction of the node task data of the user on a certain node on the workflow, and thus the query instruction carries the node identifier of corresponding node and the user identifier. The node identifier can be composed of a preset number of at least one type of character such as digit, letter, punctuation mark, and other special character for uniquely identifying the corresponding node.

In an embodiment, after detecting that the user has successfully logged in the BPM system, the terminal can directly trigger the query instruction for the corresponding node task data. The node to which the query instruction is directed can be a certain preset node in the workflow associated with the user identifier.

In step S204, the node task data associated with the user identifier is queried from a node task data table associated with the node identifier according to the query instruction.

In this embodiment, the node task data is the task data in the corresponding workflow data flowed to a certain workflow node. The node task data table is a preset data table for storing the node task data. In one embodiment, corresponding node task data table can be set for each node. An association relation is established between the set node task data table and the node identifier of the corresponding node. And all node task data flowing to the same node is stored in the corresponding node task data table.

Further, an association relation between each user and one or more of the nodes is pre-established in the BPM system, and the association relation is used to indicate whether a user has the permission to access, query, or process some or all of the node task data on the corresponding node. For example, an association relation can be established between the user identifier of all users having processing permission of the node task data to be processed flowing to the certain node and the node identifier of the node. Further, an association relation can be established between the user identifier of the user having access, query or processing capability for the node task data and the corresponding node task data.

After receiving the corresponding query instruction, the terminal can query the node task data table associated with the node identifier carried in the query instruction according to the query instruction, and query the node task data in the node task data table that is in an association relation with the user identifier. The node task data queried is the data to be displayed.

In an embodiment, the query instruction can further carry a status information of the node task data to be displayed. The status information can be "processed" or "to be processed", or any history records of the node task data. The terminal may filter out the node task data matching the status information from the associated node task data for setting as the node task data to be displayed.

In step S206, a variable configuration information associated with the user identifier is queried from a variable configuration information table associated with the node identifier.

In this embodiment, a variable configuration information table is further provided, which is used to store corresponding variable configuration information. Each variable configuration information contains a corresponding variable identifier and a variable value data type. The variable identifier is used to uniquely identify a corresponding variable. The variable is the node task data or a certain field in the workflow data to which the node task belongs. The variable value is a specific value of the corresponding field in the node data. The data types can include numeric, string, integer, and the like. The variable configuration information is used to sort and display the corresponding node data, and can further include a sorting and display rule for the variable value. For example, in a certain claims review session on a property insurance type workflow, the variable configuration information can include a claim amount field in the node task data on the review session, and the variable configuration information can be further sorted and displayed according to the specific variable value on the claim amount field (i.e. a numerical value of the claim amount). For example, when the variable value is a numerical value, it can be configured to sort according to the size of the variable value; and when the variable value is a certain fixed character, for example, "high", "medium", "low", etc., it can be set to sort following a sequence of "high", "medium", "low".

In one embodiment, the variable configuration information can be multiple, and it can be comprehensive sorted according to variable values of multiple variables. The terminal can determine the variable configuration information table associated with the node identifier according to the node identifier, and then query the variable configuration information associated with the user identifier from the variable configuration information table. The variable configuration information associated with the user identifier is the partial or whole variable configuration information selected by the corresponding user from the variable configuration information set for the node. The variable configuration information selected by the user is associated with the user identifier thereof by setting corresponding variable configuration information for each node and then providing the variable configuration information to the user to selection, which allows the user to personalize the provided variable configuration information, therefore improving the flexibility of configuring the variable configuration information.

In step S208, a variable value corresponding to the variable configuration information is extracted from each of the queried node task data.

In this embodiment, after determining the variable configuration information corresponding to the query instruction, the variable configured in the variable configuration information can be extracted and the variable value of corresponding field is read from each copy of queried node task data according to the variable configured therein. And the node task data to which the extracted variable value belongs is recorded.

In step S210, each copy of queried node task data is sorted and displayed according to the extracted variable value in each copy of node task data.

In this embodiment, the extracted variable values can be further sorted according to the sort rules set in the variable configuration information. For example, the variable value of numerical type can be sorted according to the numerical value, or the variable value of the data type such as string and the like can be sorted according to the preset string sort rule. After determining the sequence of the corresponding variable values, the node task data can be sorted on a corresponding sorting interface of the terminal based on the determined sequence of variable values according to the recorded node task data to which each variable value belongs.

In the above-mentioned method of displaying node task data, the node task data table and the variable configuration information table associated with the node identifier are set, the node task data associated with the user identifier is acquired from the associated node task data table, the variable configuration information associated with the user identifier is acquired from the associated variable configuration information table, the variable value in each copy of node task data is acquired according to the variable configuration information, the variable is sorted according to the configuration relation set in the variable configuration information, and the acquired node task data is sorted and displayed according to the sorting of the variable value, so that the node task data to be displayed is sorted and displayed according to the variable information customly configured by the user for different nodes and users. The variable configuration information corresponding to different nodes and users can be different, thus achieving the flexible sorting and displaying of the node task data.

Figure 3:
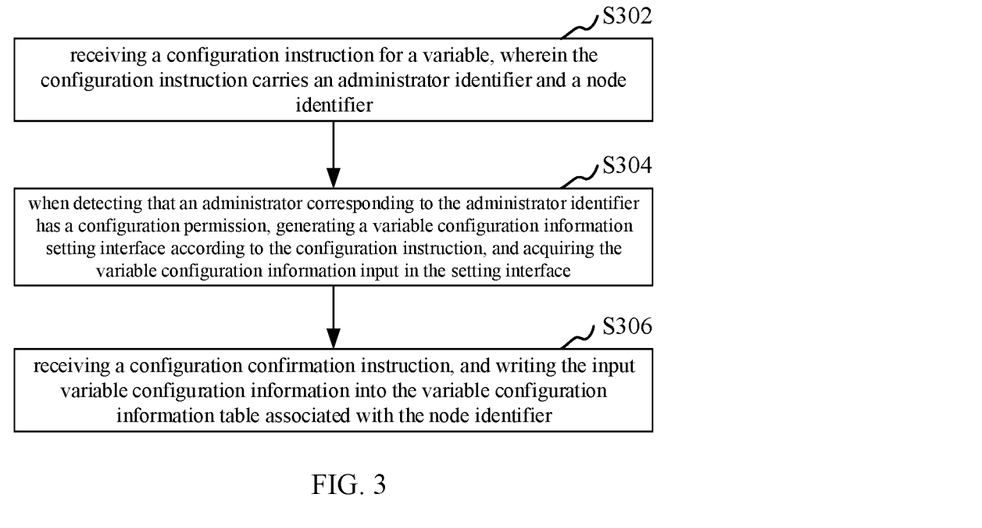
FIG. 3 is a flowchart of a configuring process for a variable configuration information according to one of the embodiments.

In one embodiment, the above-mentioned method of displaying node task data further includes a process of configuring the variable configuration information, which can be performed before triggering the query instruction or after sorting and displaying the node task data. As shown in FIG. 3, the process includes:

In step S302, a configuration instruction for a variable is received, the configuration instruction carries an administrator identifier and a node identifier.

In this embodiment, the configuration instruction is a configuration instruction for the variable on the node, which is used to trigger a configuration of a common variable configuration information for each node. The terminal can provide a configuration button for triggering the configuration instruction on the workflow data processing interface, and generate the configuration instruction for the variable when detecting a click operation on the button. The configuration instruction carries the administrator identifier and the node identifier. The node identifier is the node identifier of the node of the selected variable to be set, and the administrator identifier is an information for uniquely identifying the corresponding administrator, and can be the user identifier of the corresponding user.

In step S304, when it is detected that the administrator corresponding to the administrator identifier has a configuration permission, a variable configuration information setting interface is generated according to the configuration instruction, and the variable configuration information input in the setting interface is acquired.

In this embodiment, when detecting the configuration instruction, the terminal can detect whether the administrator identifier has the configuration permission for performing variable configuration on the node.

In one embodiment, a corresponding configuration permission table can be preset for each node identifier, which stores administrator identifiers of the administrators having a common variable configuration permission for the node. When determining whether a administrator has the configuration permission, it is possible to detect whether the administrator identifier has the configuration permission table corresponding to the node identifier, if yes, then it determines that the corresponding administrator has the configuration permission and generates the corresponding variable configuration information setting interface. The interface is a setting interface for the variable of the corresponding node, and acquires the variable configuration information input by the user in the interface. The input variable configuration information includes a modification information or a deletion information of a set variable, and it can also be an added configuration information of the variable. The variable can be selected from common fields contained in the node task data of the node, or be selected from the fields contained in the entire workflow data.

Further, all the fields in the above-mentioned node task data or the workflow data can be provided. An operation of selecting or deselecting one or more fields therein of the user can be received. The selected field is set into the variable to be configured, and the configuration information for the selected field is received.

In step S306, a configuration confirmation instruction is received, and the input variable configuration information is written into the variable configuration information table associated with the node identifier.

In this embodiment, a confirmation button for triggering a completion of the variable configuration can be provided on the interface. When a click operation on the confirmation button is detected, the configuration confirmation instruction is triggered. The variable configuration information input on the interface is written into the node task data table associated with the node identifier according to the triggered configuration confirmation instruction. A plurality of variable configuration information tables can be preset, and different variable configuration information tables are used to store the variable configuration information corresponding to one or several different nodes. And a correspondence between the variable configuration information table and the node identifier corresponding to the one or more different nodes is established. Alternatively, a total variable configuration information table can be set for all nodes in the workflow, and the corresponding nodes to which the variable configuration information stored in the variable configuration information table belongs is recorded, so that the variable configuration information set for corresponding node can be queried according to the node identifier of corresponding node.

In this embodiment, it allows the administrator to configure different variables for each nodes according to the configuration instruction, which further improves the flexibility of the variable configuration, and enables the user to select the configured variables to process the node, thus enabling each user to personalize the display of the node task information on the processed node.

Figure 4:
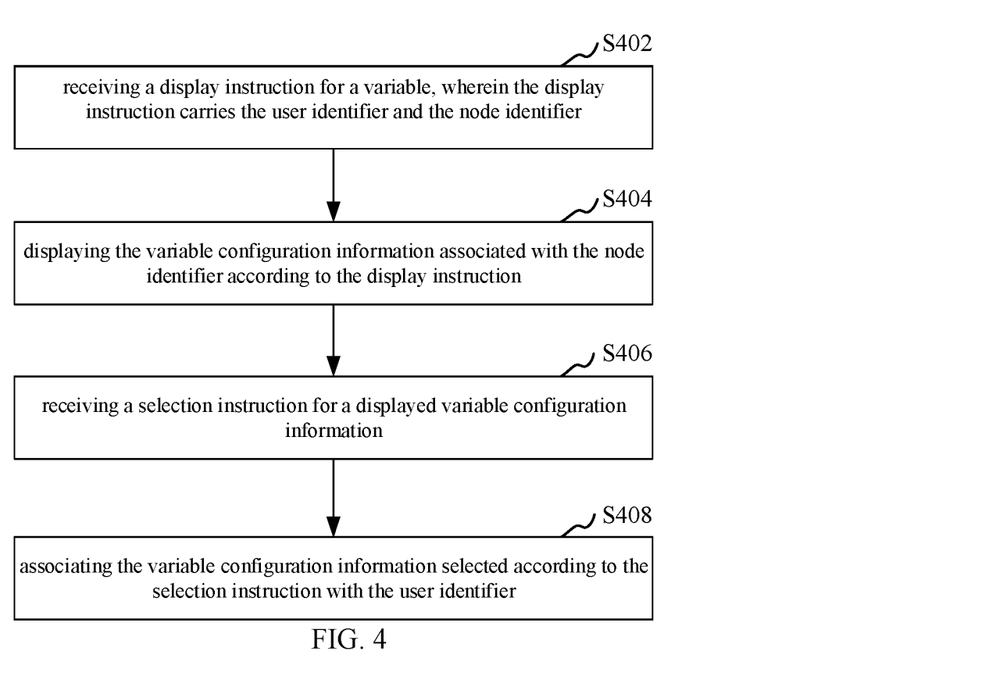
FIG. 4 is a flowchart of a selection process for a variable configuration information according to one of the embodiments.

In one embodiment, the above-mentioned method of displaying node task data further includes a process of selecting the variable configuration information, which can also be performed before triggering the query instruction or after sorting and displaying the node task data. As shown in FIG. 4, the process includes:

In step S402, a display instruction for the variable is received, and the configuration instruction carries the user identifier and the node identifier.

In this embodiment, the terminal can provide a display button on the workflow data processing interface for triggering a view and/or selection of the configured variable. When detecting a click operation on the button, a display instruction of the variable is generated. The display instruction carries the user identifier and the node identifier. The node identifier is a node identifier of the node of the selected variable to be displayed. Optionally, the user can perform a node selection before or after clicking the display button. Alternatively, the node corresponding to the current interface displayed on the interface can be treated as the selected node, and the node identifier of the selected node is carried into the display instruction.

In step S404, the variable configuration information associated with the node identifier is displayed according to the display instruction.

In this embodiment, the terminal can read a preset variable configuration information associated with the variable identifier from the variable configuration information table associated with the node identifier, and display the read variable configuration information in a corresponding variable selection interface. Previous selection status of each variable by the user can be further acquired, and the selection status of each variable is also displayed in the corresponding selection interface. Optionally, the variable configuration information associated with the node identifier is displayed in a form of list according to the display instruction, and corresponding selection status is displayed in the configuration information of each row of variables. The selection status includes a selected status and a unselected status.

In step S406, a selection instruction is received for the displayed variable configuration information.

In this embodiment, the terminal can provide a corresponding button in the interface for triggering the selection confirmation of the variable, and generate the selection instruction after detecting a click operation on the button. The user can select the displayed variable configuration information, and the terminal can carry the selected variable configuration information into the triggered selection instruction when detecting the selected operation of the user. In one embodiment, user's selection or deselection of corresponding variable can be determined by detecting an operation on the selection status provided on the display interface. The selected variable can be partial or whole variables configured for the corresponding node.

In step S408, the variable configuration information selected by the selection instruction is associated with the user identifier.

In this embodiment, the terminal can associate the variable configuration information selected by the selection instruction with the user identifier to implement the user's custom selection operation of the variable configuration information. By associating the selected variable configuration information with the user identifier, different users can select whole or partial corresponding different variable from the variable configuration information set for each node. The node task data of corresponding node is sorted and displayed according to the selected variable, so as to further implement each user's custom sort and display of the node task data.

Figure 5:
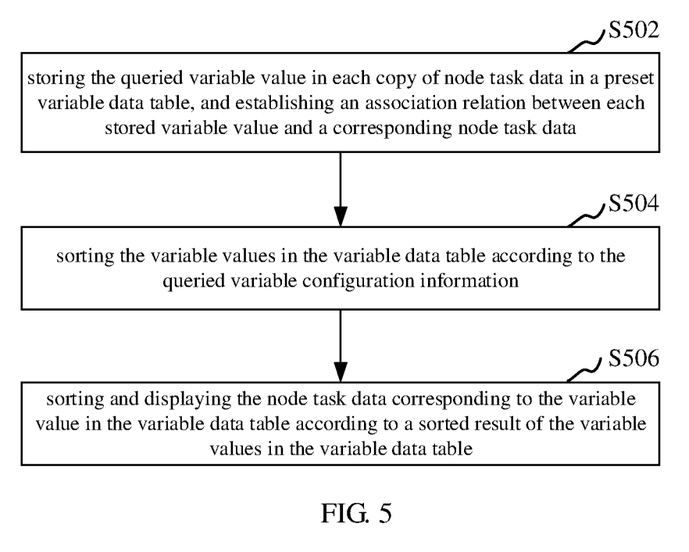
FIG. 5 is a flowchart of sorting and displaying each copy of queried node task data according to an extracted variable value in each copy of node task data in accordance with one of the embodiments.

In one embodiment, as shown in FIG. 5, the above-mentioned step S210 includes:

In step S502, the extracted variable value in each copy of node task data is stored in a preset variable data table, and an association relation between each stored variable value and the corresponding node task data is established.

In this embodiment, the terminal further sets the variable data table, which is used to store the variable value of related variables extracted from the node task data to be displayed. The terminal can preset a storage space in the variable data table for the variable selected by the user according to the user's selection operation of the variable configuration information. The extracted variable value of each copy of node task data can be stored in corresponding task data table, specifically, stored in a position of the task data table that is used to store corresponding variable value. The association relation between each stored variable value and corresponding node task data is established, so that the node task data to which the extracted variable value belongs is recorded and learned according to the association relation.

In step S504, the variable values in the variable data table is sorted according to the queried variable configuration information.

In this embodiment, the variable data table further synchronizes the sort rule set in the variable configuration information, and sorts the variables stored therein according to the sort rule. A sequence of corresponding node task data can be learned according to the sequence of the variable values. A copy of the variable value in the variable data table corresponds to a copy of the field value of the corresponding field in the node task data. A copy of the field value can include one or more field value, and the specific number thereof is the number of variables in the corresponding variable configuration information.

In step S506, the node task data corresponding to the variable value in the variable data table is sorted and displayed according to a sorted result of the variable value in the variable data table.

In this embodiment, the sequence of the variable values in the variable data table is the same as the sequence of corresponding node task data. The terminal can read the sorted result of each copy of the variable values in the variable data table, sort and display the queried node task data according to the sorted result.

Since only the variable value of the variable involved in the variable configuration information is stored in the variable data table, a sorting of the variable values in the variable data table is more efficient, and an efficiency of the sorting of the node task data can be correspondingly improved by sorting the node task data according to the sorted result in the variable data table.

In one embodiment, the variable configuration information includes the variable identifier and the variable value data type; and the above-mentioned step S208 includes: extracting the variable value corresponding to the variable identifier and matching the data type from the queried each copy of node task data.

In this embodiment, the variable value corresponding to the variable identifier can be queried from the node task data. The variable identifier is the same as the variable identifier in the variable configuration information, and the data type of the variable is the data type recorded in the variable configuration information. The data type recorded in the variable configuration information is the data type presented according to corresponding variable in the business datatable. The accuracy of the extracted variable value can be further improved by extracting the variable value corresponding to the variable identifier in the variable configuration information and matching the data type.

Figure 6:
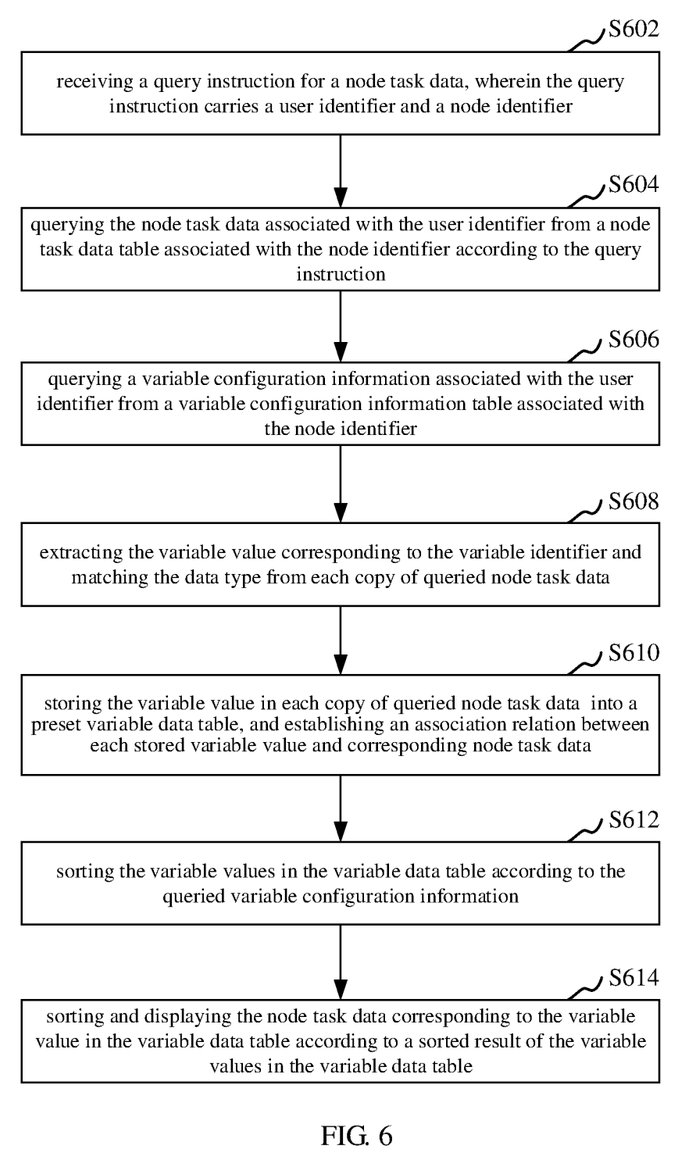
FIG. 6 is a flowchart illustrating a method of displaying node task data according to another embodiment.

In one embodiment, as shown in FIG. 6, another method of displaying node task data is provided, which includes:

In step S602, a query instruction for the node task data is received, and the query instruction carries a user identifier and a node identifier.

In one embodiment, the query instruction for the node task data of a preset default node can be automatically generated upon detecting a node task data access request. The query instruction of the node task data of the node corresponding to a query button can also be triggered when receiving a query button for triggering the node task data on a certain node.

In step S604, the node task data associated with the user identifier is queried from a node task data table associated with the node identifier according to the query instruction.

In this embodiment, the queried node task data can be the task data in the query status corresponding to the query instruction. The terminal can filter out the node task data matching the status information from the associated node task data as the node task data to be displayed. For example, it can be the node task data to be processed under the node.

In step S606, a variable configuration information associated with the user identifier is queried from a variable configuration information table associated with the node identifier; and the variable configuration information includes a variable identifier and a variable value data type.

In this embodiment, the variable configuration information table can be correspondingly set for each node, and the set variable configuration information table is associated with the node identifier of the corresponding node, so that the variable configuration information stored in each variable configuration information table is the variable configured for the corresponding associated node. The corresponding variable configuration information table can also be set for all nodes, and the node identifier associated with the variable configuration information can be set for each variable configuration information stored in the table.

The terminal can detect each variable configuration information associated with the node identifier carried by the query instruction, and whether a person is associated with the user identifier, that is, detect whether the variable configuration information is the variable configuration information selected and set by the user, therefore querying out the variable configuration information associated with the user identifier.

The variable configuration information can be multiple, such that a comprehensive sorting can be performed according to the variable values of multiple set variables. The variable configuration information includes the variable identifier and the variable value data type. The data type recorded in the variable configuration information is a data type presented according to a corresponding variable in the business datatable. The variable configuration information further includes a corresponding sort rule set according to the data type, such that the sorting of the corresponding variable values can be determined according to the sort rule. For example, the variable configuration information includes a field A, the variable value data type of which is numerical value, and a field B, the variable value data type of which is string type. The field B is fixed to "high", "medium", "low" and other fixed characters. The set variable configuration information is preferentially sorted according to the variable value of the field B in the sequence of "high", "medium", "low", and for those fields B which have the same variable value, they are sorted according the variable value size of the variable A, from large to small.

In step S608, a variable value corresponding to the variable identifier and matching the data type is extracted from each copy of queried node task data.

In this embodiment, the variable value corresponding to the variable identifier can be queried from the node task data. The variable identifier is the same as the variable identifier in the variable configuration information, and the variable value data type is the data type recorded in the variable configuration information.

In step S610, the variable value in each copy of queried node task data is stored into a preset variable data table, and an association relation between each stored variable value and corresponding node task data is established.

In this embodiment, the terminal can set the corresponding variable data table for the variable configuration information associated with the user identifier, so that the variable value of the corresponding data type is stored in the variable data table, and the sort rule in the variable configuration information is also correspondingly synchronized to the sort and display rule of each field. After extracting the variable value in the corresponding node task data, the variable value can be stored in a corresponding set storage position, and the association relation between each stored variable value and corresponding node task data is established, such that the node task data to which the extracted variable value belongs is recorded and learned according to the association relation.

In step S612, the variable values in the variable data table is sorted according to the queried variable configuration information.

In step S614, the node task data corresponding to the variable value in the variable data table is sorted and displayed according to a sort result of the variable values in the variable data table.

In this embodiment, each copy of stored variable value can be automatically sorted according to the sort rule of the variable configuration information synchronized in the variable data table, and the sorting is used as the sorting result corresponding to the associated node service data. The node business datato be displayed and corresponding to the query instruction is sorted and displayed according to the determined sorting result.

In this embodiment, the variable configuration information is set for storing the variable configuration information associated with the user identifier and the node identifier. The variable data table is set for storing and sorting the variable value extracted according to the variable configuration information. The final node business data to be displayed is sorted and displayed according to the sorting result, which improves the efficiency of sorting and displaying of the node business data.

Figure 7:
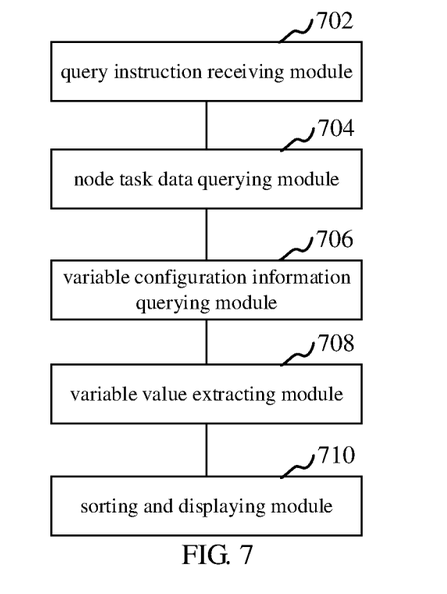
FIG. 7 is a block diagram of a node task data device according to one of the embodiments.

In one embodiment, as shown in FIG. 7, a node task data display device is provided, which includes:

a query instruction receiving module 702, which is used to receive a query instruction for node task data, and the query instruction carries a user identifier and a node identifier;

a node task data querying module 704, which is used to query the node task data associated with the user identifier from a node task data table associated with the node identifier according to the query instruction;

a variable configuration information querying module 706, which is used to query a variable configuration information associated with the user identifier from a variable configuration information table associated with the node identifier;

a variable value extraction module 708, which is used to extract a variable value corresponding to the variable configuration information from each copy of queried node task data; and a sort and display module 710, which is used to sort and display each copy of queried node task data according to the extracted variable value in the each copy of node task data.

Figure 8:
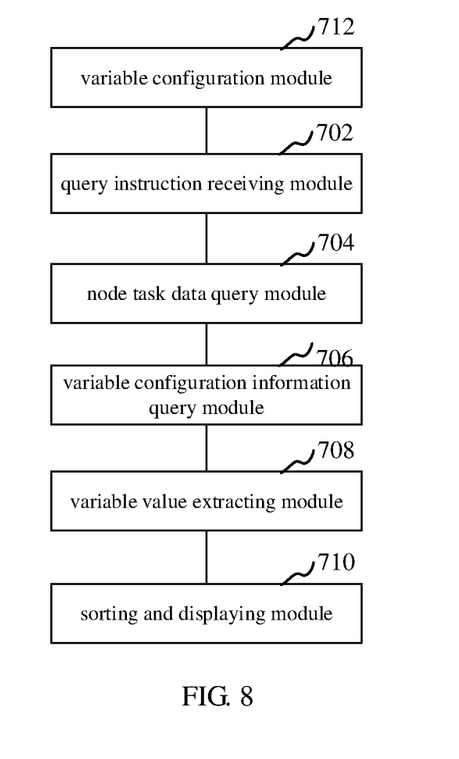
FIG. 8 is a block diagram of a node task data device according to another embodiment.

In one embodiment, as shown in FIG. 8, the device further includes:

a variable configuration module 712, which is used to receive a configuration instruction carrying an administrator identifier and a node identifier for a variable; When detecting that the administrator identifier has a configuration permission, generating a variable configuration information setting interface according to the configuration instruction and acquiring the variable configuration information input in the setting interface; receiving a configuration confirmation instruction; and writing the input variable configuration information into the variable configuration information table associated with the node identifier.

Figure 9:
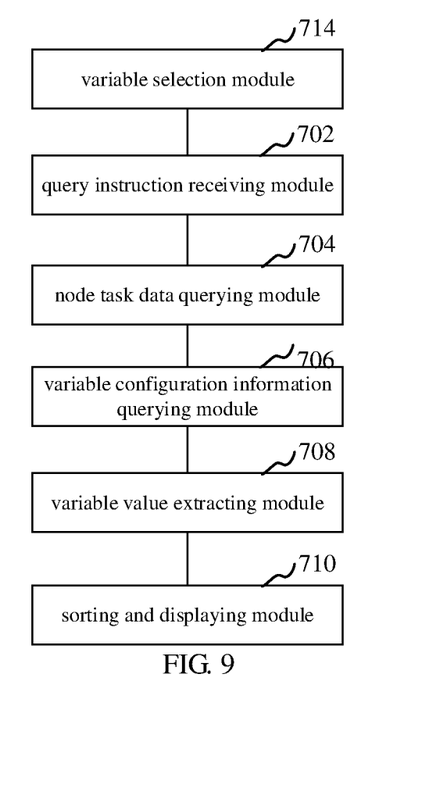
FIG. 9 is a block diagram of a node task data device according to a still another embodiment.

In one embodiment, as shown in FIG. 9, the device further includes:

a variable selection module 714, which is used to receive a display instruction, which carries the user identifier and the node identifier, for a variable; displaying the variable configuration information associated with the node identifier according to the display instruction; a selection instruction for receiving variable configuration information; receiving a selection instruction for a displayed variable configuration information; and associating the variable configuration information selected according to the selection instruction with the user identifier.

In one embodiment, the sort and display module 710 is further used to store the variable value in each copy of queried node task data to a preset variable data table, and establishing an association relation between each stored variable value and the corresponding node task data; sorting the variable values in the variable data table according to the queried variable configuration information; and sorting and displaying the node task data corresponding to variable value in the variable data table according to the sorted result of the variable value in the variable data table.

In one embodiment, the variable configuration information includes a variable identifier and a variable value data type. The variable value extraction module 708 is further used to extract the variable value corresponding to the variable identifier and matching the data type from each copy of queried node task data.

Each module in the forgoing devices can be implemented in whole or in part by software, hardware, and combinations thereof. The network interface can be an Ethernet card or a wireless network card. Each of the above modules can be of hardware form embedded in or separately from a processor, or be of software form stored in a memory of a server, so that the processor calls to perform operations corresponding to the above modules. The processor can be a central processing unit (CPU), a microprocessor, a microcontroller, or the like.

Figure 10:
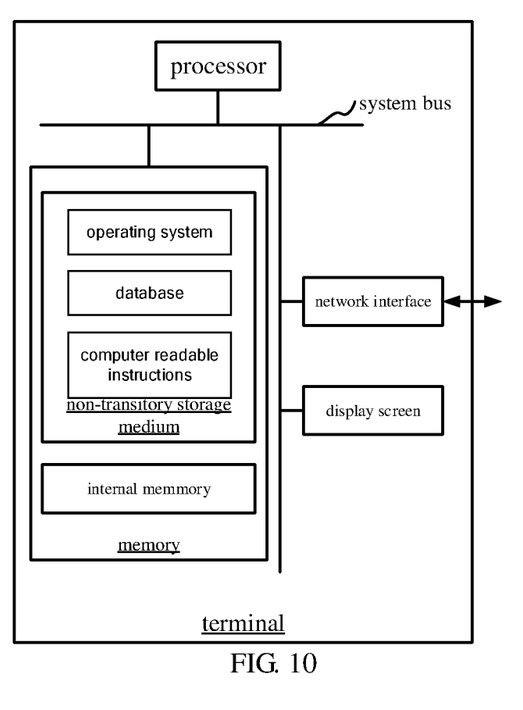
FIG. 10 is a block diagram of a computer apparatus according to one of the embodiments.

In one embodiment, the node task data display device provided by the present disclosure can be implemented in the form of a computer program which can be executed on a computer apparatus as shown in FIG. 10. A non-transitory storage medium of the computer apparatus can store various program modules constituting the node task data display device. For example, the query instruction receiving module 702, the node task data querying module 704, the variable configuration information querying module 706, and the variable value extraction module 708 and the sort and display module 710 shown in FIG. 7, the variable configuration module 712 of FIG. 8, and the variable selection module 714 of FIG. 9 can be included. Each program module includes computer-readable instructions which is used to cause the computer apparatus to perform the steps of the method of displaying node task data in various embodiments of the present application described in the present specification. For example, the computer apparatus can receive the query instruction which carries the user identifier and the node identifier for the node task data via the query instruction receiving module 702 in the node task data display device as shown in FIG. 7; query the node task data associated with the user identifier from the node task data table associated with the node identifier according to the query instruction via the node task data querying module 704; query the variable configuration information associated with the user identifier from the variable configuration information table associated with the node identifier via the variable configuration information querying module 706; and extract the variable value corresponding to the variable configuration information from each copy of queried node task data via the variable value extraction module 708.

In one embodiment, at least one non-transitory computer-readable storage medium that includes computer-readable instructions is provided. The computer-readable instructions, when executed by one or more processors, cause the one or more processors to perform the steps of the method of displaying node task data provided by above-mentioned embodiments.

In one embodiment, the computer-readable instructions when executed by one or more processors, cause the one or more processor to perform the steps of: receiving a query instruction for node task data, the query instruction carrying a user identifier and a node identifier; querying the node task data associated with the user identifier from a node task data table associated with the node identifier according to the query instruction; querying a variable configuration information associated with the user identifier from a variable configuration information table associated with the node identifier; extracting a variable value corresponding to the variable configuration information from each copy of queried node task data; and sorting and displaying each copy of queried node task data according to an extracted variable value in each copy of node task data.

In one embodiment, the computer-readable instructions when executed by one or more processors, further causes the one or more processors to perform the steps of: receiving a configuration instruction for a variable, the configuration instruction carrying an administrator identifier and a node identifier; when detecting that the administrator identifier has a configuration permission, generating a variable configuration information setting interface according to the configuration instruction, and acquiring the variable configuration information input in the setting interface; and receiving a configuration confirmation instruction, and writing the input variable configuration information into the variable configuration information table associated with the node identifier.

In one embodiment, the computer-readable instructions when executed by one or more processors, further causes the one or more processors to perform the steps of: receiving a display instruction for a variable, the configuration instruction carrying the user identifier and the node identifier; displaying the variable configuration information associated with the node identifier according to the display instruction; receiving a selection instruction for a displayed variable configuration information; and associating the variable configuration information selected according to the selection instruction with the user identifier.

In one embodiment, the computer-readable instructions when executed by one or more processors, further causes the step of sorting and displaying each copy of queried node task data according to an extracted variable value in each copy of node task data performed by the one or more processors to includes the steps of: storing the queried variable value in each copy of node task data in a preset variable data table, and establishing an association relation between each stored variable value and corresponding node task data; sorting the variable values in the variable data table according to the queried variable configuration information; and sorting and displaying the node task data corresponding to the variable value in the variable data table according to a sorted result of the variable values in the variable data table.

In one embodiment, the variable configuration information includes a variable identifier and a variable value data type. The computer-readable instructions when executed by one or more processors, further causes the step of extracting a variable value corresponding to the variable configuration information from each copy of queried node task data performed by the one or more processors to includes the steps of: extracting the variable value corresponding to the variable identifier and matching the data type from each copy of queried node task data.

In one embodiment, a computer apparatus is provided, which includes a processor and a memory storing computer-readable instructions, which, when executed by the processor, causes the processor to perform the steps of the method of displaying node task data provided by above-mentioned embodiments.

In one embodiment, the computer apparatus can be, but not limited to, at least one of the terminals such as smart phone, tablet computer, laptop, and portable wearable device. As shown in FIG. 10, it is a block diagram of the internal structure of the terminal in one embodiment. The terminal includes a processor, a memory, a network interface, and a display screen coupled via a system bus. The processor of the terminal is used to provide calculation and control capabilities to support the entire operation of the terminal. The memory is used to store data, instruction code, and the like, and the memory stores at least one computer-readable instruction, which can be executed by the processor to implement the method of displaying node task data applicable to the terminal provided in the embodiments of the present application. The memory can include a non-transitory storage medium such as a magnetic disk, an optical disk, or a read-only memory (ROM). For example, in one embodiment, the memory includes a non-transitory storage medium and an internal memory. The non-transitory storage medium of the terminal stores an operating system, a database, and computer-readable instructions. The database stores data related to implement the method of displaying node task data provided by the foregoing various embodiments, for example, the node task data and the variable configuration information can be stored. The computer-readable instructions can be executed by the processor to implement the method of displaying node task data provided by the forgoing various embodiments. The internal memory in the terminal provides a cached operating environment for the operating system, the database, and the computer-readable instructions in the non-transitory storage medium. The network interface can be an Ethernet card or a wireless network card, etc., for communicating with an external terminal or server. The display screen of the terminal can be a touch screen, such as a capacitive screen or an electronic screen, which can generate a corresponding instruction by receiving a click operation acted on a control displayed on the touch screen. Persons skilled in the art can understand that, the structure shown in FIG. 10 is only a part of the structure of the solution of the present disclosure, which does not impose limitation to the terminal to which the solution of the present application is applied. Specifically, the terminal can include more or less components than those shown in the drawing, or can combine some components, or can have different component deployment.

In one embodiment, the instructions, when executed by the processor, cause the processor to perform the steps of: receiving a query instruction for node task data, the query instruction carrying a user identifier and a node identifier; querying the node task data associated with the user identifier from a node task data table associated with the node identifier according to the query instruction; querying a variable configuration information associated with the user identifier from a variable configuration information table associated with the node identifier; extracting a variable value corresponding to the variable configuration information from each copy of queried node task data; and sorting and displaying each copy of queried node task data according to an extracted variable value in each copy of node task data.

In one embodiment, the instructions, when executed by the processor, further cause the processor to perform the steps of: receiving a configuration instruction for a variable, wherein the configuration instruction carries an administrator identifier and a node identifier; when detecting that an administrator corresponding to the administrator identifier has a configuration permission, generating a variable configuration information setting interface according to the configuration instruction, and acquiring the variable configuration information input in the setting interface; and receiving a configuration confirmation instruction, and writing the input variable configuration information into the variable configuration information table associated with the node identifier.

In one embodiment, the instructions, when executed by the processor, further cause the processor to perform the steps of: receiving a display instruction for a variable, wherein the configuration instruction carries the user identifier and the node identifier; displaying the variable configuration information associated with the node identifier according to the display instruction; receiving a selection instruction for a displayed variable configuration information; and associating the variable configuration information selected according to the selection instruction with the user identifier.

In one embodiment, the instructions, when executed by the processor, further cause the step of sorting and displaying each copy of queried node task data according to an extracted variable value in each copy of node task data performed by the processor to include the steps of: storing the queried variable value in each copy of node task data in a preset variable data table, and establishing an association relation between each stored variable value and corresponding node task data; sorting the variable values in the variable data table according to the queried variable configuration information; and sorting and displaying the node task data corresponding to the variable value in the variable data table according to a sorted result of the variable values in the variable data table.

In one embodiment, the variable configuration information includes a a variable identifier and a variable value data type; the instructions, when executed by the processor, further cause the step of extracting a variable value corresponding to the variable configuration information from each copy of queried node task data to include the steps of: extracting the variable value corresponding to the variable identifier and matching the data type from each copy of queried node task data.

A person skilled in the art should understand that the processes of the methods in the above embodiments can be, in full or in part, implemented by computer-readable instructions instructing underlying hardware. The computer-readable instructions can be stored in a memory, for example be stored in a non-transitory computer-readable storage medium. The computer-readable instructions can include the processes in the embodiments of the various methods when it is being executed.

Any references to memory, storage, databases, or other media used herein can include non-transitory and/or transitory memory. Suitable non-transitory memory can include read only memory (ROM), programmable ROM (PROM), electrically programmable ROM (EPROM), electrically erasable programmable ROM (EEPROM), or flash memory.

Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of displaying node task data performed by one or more processors, comprising:
   receiving a query instruction for node task data, wherein the query instruction carries a user identifier and a node identifier;
   querying the node task data associated with the user identifier from a node task data table associated with the node identifier according to the query instruction;
   querying a variable configuration information associated with the user identifier from a variable configuration information table associated with the node identifier;
   extracting a variable value corresponding to the variable configuration information from each piece of queried node task data; and
   sorting and displaying each piece of queried node task data according to an extracted variable value in each piece of queried node task data.

2. The method of claim 1, further comprising:
   receiving a configuration instruction for a variable, wherein the configuration instruction carries an administrator identifier and a node identifier;
   when detecting that an administrator corresponding to the administrator identifier has a configuration permission, generating a variable configuration information setting interface according to the configuration instruction, and acquiring the variable configuration information input in the variable configuration information setting interface; and
   receiving a configuration confirmation instruction, and writing the input variable configuration information into the variable configuration information table associated with the node identifier.

3. The method of claim 1, further comprising:
   receiving a display instruction for a variable, wherein the display instruction carries the user identifier and the node identifier;

displaying the variable configuration information associated with the node identifier according to the display instruction;

receiving a selection instruction for a displayed variable configuration information; and associating the variable configuration information selected according to the selection instruction with the user identifier.

4. The method of claim 1, wherein the sorting and displaying each piece of queried node task data according to an extracted variable value in each piece of queried node task data comprises:

storing the extracted variable value in each piece of queried node task data in a preset variable data table, and establishing an association relation between each stored variable value and corresponding node task data;

sorting extracted variable values in the preset variable data table according to the queried variable configuration information; and sorting and displaying the node task data corresponding to the extracted variable value in the preset variable data table according to a sorted result of the extracted variable values in the preset variable data table.

5. The method of claim 1, wherein the variable configuration information comprises a variable identifier and a data type of the variable value;

wherein the step of extracting the variable value corresponding to the variable configuration information from each piece of queried node task data, comprises:

extracting the variable value corresponding to the variable identifier and matching the data type from each piece of queried node task data.

6. The method of claim 3, wherein the displaying the variable configuration information associated with the node identifier according to the display instruction, comprises:

displaying the variable configuration information associated with the node identifier in a form of list according to the display instruction, and displaying a corresponding selection status in the variable configuration information of each row of variables.

7. At least one non-transitory computer-readable storage medium storing computer-readable instructions, which, when executed by one or more processors, causing the one or more processors to perform the following steps:

receiving a query instruction for node task data, wherein the query instruction carries a user identifier and a node identifier;

according to the query instruction, querying the node task data associated with the user identifier from a node task data table associated with the node identifier;

querying a variable configuration information associated with the user identifier from a variable configuration information table associated with the node identifier;

extracting a variable value corresponding to the variable configuration information from each piece of queried node task data; and sorting and displaying each piece of queried node task data according to an extracted variable value in each piece of queried node task data.

8. The at least one non-transitory computer-readable storage medium of claim 7, wherein the computer-readable instructions, which when executed by one or more processors, further cause the one or more processors to perform the following steps:

receiving a configuration instruction for a variable, wherein the configuration instruction carries an administrator identifier and a node identifier;

when it is detected that an administrator corresponding to the administrator identifier has a configuration permission, generating a variable configuration information setting interface according to the configuration instruction, and acquiring the variable configuration information input in the variable configuration information setting interface; and receiving a configuration confirmation instruction, and writing the input variable configuration information into the variable configuration information table associated with the node identifier.

9. The at least one non-transitory computer-readable storage medium of claim 7, wherein the computer-readable instructions, which, when executed by one or more processors, further cause the one or more processors to perform the following steps:

receiving a display instruction for a variable, wherein the display instruction carries the user identifier and the node identifier;

displaying the variable configuration information associated with the node identifier according to the display instruction;

receiving a selection instruction for a displayed variable configuration information; and associating the variable configuration information selected according to the selection instruction with the user identifier.

10. The at least one non-transitory computer-readable storage medium of claim 7, wherein the computer-readable instructions, which, when executed by one or more processors, further cause the one or more processors to perform the following steps:

storing the extracted variable value in each piece of queried node task data in a preset variable data table, and establishing an association relation between each stored variable value and corresponding node task data;

sorting extracted variable values in the preset variable data table according to the queried variable configuration information; and sorting and displaying the node task data corresponding to the extracted variable value in the preset variable data table according to a sorted result of the extracted variable values in the preset variable data table.

11. The at least one non-transitory computer-readable storage medium of claim 7, wherein the variable configuration information comprises a variable identifier and a variable value data type; and the computer-readable instructions, which, when executed by one or more processors, further cause the one or more processors to perform the following steps:

extracting the variable value corresponding to the variable identifier and matching the variable value data type from each piece of queried node task data.

12. The at least one non-transitory computer-readable storage medium of claim 9, wherein the computer-readable instructions, which, when executed by one or more processors, further cause the one or more processors to perform the following steps:

displaying the variable configuration information associated with the node identifier in a form of list according to the display instruction, and displaying a corresponding selection status in the variable configuration information of each row of variables.

13. A computer apparatus comprising one or more processors, and a memory storing computer-readable instructions, which, when executed by the one or more processors, causing the one or more processors to perform steps comprising:

receiving a query instruction for node task data, wherein the query instruction carries a user identifier and a node identifier;

according to the query instruction, querying the node task data associated with the user identifier from a node task data table associated with the node identifier;

querying a variable configuration information associated with the user identifier from a variable configuration information table associated with the node identifier;

extracting a variable value corresponding to the variable configuration information from each piece of queried node task data; and     sorting and displaying each piece of queried node task data according to an extracted variable value in each piece of queried node task data.

14. The computer apparatus of claim 13, wherein the computer-readable instructions when executed by the one or more processors, further causes the one or more processors to perform the following steps:

receiving a configuration instruction for a variable, wherein the configuration instruction carries an administrator identifier and a node identifier;

when it is detected that an administrator corresponding to the administrator identifier has a configuration permission, generating a variable configuration information setting interface according to the configuration instruction, and acquiring the variable configuration information input in the variable configuration information setting interface; and     receiving a configuration confirmation instruction, and writing the input variable configuration information into the variable configuration information table associated with the node identifier.

15. The computer apparatus of claim 13, wherein the computer-readable instructions when executed by the one or more processors, further causes the one or more processors to perform the following steps:

receiving a display instruction for a variable, wherein the display instruction carries the user identifier and the node identifier;

displaying the variable configuration information associated with the node identifier according to the display instruction;

receiving a selection instruction for a displayed variable configuration information; and     associating the variable configuration information selected according to the selection instruction with the user identifier.

16. The computer apparatus of claim 13, wherein the computer-readable instructions when executed by the one or more processors, further causes the one or more processors to perform the following steps:

storing the extracted variable value in each piece of queried node task data in a preset variable data table, and establishing an association relation between each stored variable value and corresponding node task data;

sorting extracted variable values in the preset variable data table according to the queried variable configuration information; and     sorting and displaying the node task data corresponding to the extracted variable value in the preset variable data table according to a sorted result of the extracted variable values in the preset variable data table.

17. The computer apparatus of claim 13, wherein the variable configuration information comprises a variable identification and a data type of the variable value; the computer-readable instructions when executed by the one or more processors, further causes the one or more processors to perform the following step:

extracting the variable value corresponding to the variable identifier and matching the data type from each piece of queried node task data.

\* \* \* \* \*